(12) United States Patent
Kühl

(10) Patent No.: US 12,722,101 B2
(45) Date of Patent: Sep. 1, 2026

(54) WATER TREATMENT PLANT

(71) Applicant: Sascha Kühl, Berlin (DE)

(72) Inventor: Sascha Kühl, Berlin (DE)

( * ) Notice: Subject to any disclaimer, the term of this patent is extended or adjusted under 35 U.S.C. 154(b) by 235 days.

(21) Appl. No.: 18/569,044

(22) PCT Filed: Jun. 9, 2022

(86) PCT No.: PCT/IB2022/055362

§ 371 (c)(1),
(2) Date: Dec. 11, 2023

(87) PCT Pub. No.: WO2023/275643

PCT Pub. Date: Jan. 5, 2023

(65) Prior Publication Data

US 2024/0278145 A1 Aug. 22, 2024

(30) Foreign Application Priority Data

Jul. 1, 2021 (DE) ......................... 102021117056.7

(51) Int. Cl.
*C02F 1/14* (2023.01)
*B01D 1/00* (2006.01)
(Continued)

(52) U.S. Cl.
CPC ......... *B01D 5/0039* (2013.01); *B01D 1/0035* (2013.01); *B01D 3/007* (2013.01);
(Continued)

(58) Field of Classification Search
CPC .... B01D 1/0035; B01D 3/007; B01D 5/0039; B01D 5/006; C02F 1/14; C02F 1/18; C02F 1/4672
See application file for complete search history.

(56) References Cited

U.S. PATENT DOCUMENTS 3,783,108 A * 1/1974 Huhta-Koivisto ........................... B01D 19/0068 203/91
4,083,781 A * 4/1978 Conger ................ B01D 61/026 210/651
(Continued)

FOREIGN PATENT DOCUMENTS

DE 4217802 A1 12/1993
DE 102017114597 A1 1/2019
(Continued)

OTHER PUBLICATIONS

International Search Report and Written Opinion for corresponding International Patent Application No. PCT/IB2022/055362 dated Nov. 14, 2022; priority document (German).
(Continued)

*Primary Examiner* — Jonathan Miller
(74) *Attorney, Agent, or Firm* — Greer, Burns & Crain, Ltd.

(57) ABSTRACT

A water treatment plant, having at least one storage container for storing water to be treated, an evaporator for evaporating the water to be treated, a condenser for condensing the water evaporated in the evaporator, the condenser being fed on the cooling water side with water to be treated, which is flowing to the evaporator. The storage container is arranged above the evaporator, and the condenser is arranged at the level of the base of the evaporator, the storage container being closable in an airtight manner and opening with an outlet into an overflow pot, the surface height of which is arranged slightly below a vapor outlet of the evaporator. The overflow pot is connected to the cooling water inlet of the condenser. A cooling water outlet of the condenser is connected to an inlet of the evaporator.

11 Claims, 4 Drawing Sheets

(51) Int. Cl.
*B01D 3/00* (2006.01)
*B01D 5/00* (2006.01)
*C02F 1/18* (2023.01)
*C02F 1/467* (2023.01)

(52) U.S. Cl.
CPC ................ *B01D 5/006* (2013.01); *C02F 1/14* (2013.01); *C02F 1/18* (2013.01); *C02F 1/4672* (2013.01); *C02F 2201/46165* (2013.01)

(56) References Cited

U.S. PATENT DOCUMENTS

| | | | | |
|---|---|---|---|---|
| 4,841,731 A * | 6/1989 | Tindell | F01K 25/005 | 60/39.12 |
| 5,178,734 A * | 1/1993 | Palmer | B01D 5/0006 | 203/1 |
| 5,538,598 A * | 7/1996 | Schlesinger | B09C 1/06 | 202/205 |
| 5,565,065 A * | 10/1996 | Wang | B01D 1/0017 | 202/180 |
| 5,645,693 A * | 7/1997 | Gode | B01D 1/26 | 203/DIG. 1 |
| 5,932,073 A * | 8/1999 | Land | C02F 1/04 | 203/1 |
| 6,303,006 B1 * | 10/2001 | Chang | B01D 3/10 | 202/205 |
| 6,830,661 B1 * | 12/2004 | Land | F28D 1/0472 | 202/83 |
| 7,608,171 B2 * | 10/2009 | Otukol | B01D 1/22 | 202/172 |
| 7,886,557 B2 * | 2/2011 | Anderson | B01D 5/0072 | 62/272 |
| 10,207,935 B2 * | 2/2019 | Beitelmal | B01D 1/0035 | |
| 10,421,030 B2 * | 9/2019 | Boylan | B01D 3/346 | |
| 2006/0113179 A1 * | 6/2006 | Hausmann | B01D 5/009 | 202/205 |
| 2010/0065414 A1 * | 3/2010 | Rautenbach | B01D 5/0009 | 202/167 |
| 2010/0187128 A1 * | 7/2010 | Neubert | B01D 1/22 | 205/742 |

FOREIGN PATENT DOCUMENTS

| | | |
|---|---|---|
| FR | 2320264 A1 | 3/1977 |
| GB | 1516683 A | 7/1978 |

OTHER PUBLICATIONS

German Office Action for corresponding German Patent Application No. 102021117056.7 dated Jan. 12, 2022; priority document.

* cited by examiner 100
160
W1
113
110
112
W2
121
SH
111
173
170
171
120
131
W1
140
W3
133
143
W1
141
153
130
132
122
123
134
150
151
152

WATER TREATMENT PLANT

CROSS-REFERENCES TO RELATED APPLICATIONS

This application claims the benefit of the International Application No. PCT/IB2022/055362, filed on Jun. 9, 2022, and of the German patent application No. 102021117056.7 filed on Jul. 1, 2021, the entire disclosures of which are incorporated herein by way of reference.

FIELD OF THE INVENTION

The invention relates to a water treatment system comprising at least one storage container for storing the water to be treated, at least one evaporator for evaporating the water to be treated, at least one condenser for condensing the water evaporated in the evaporator, wherein the condenser is fed on the cooling water side with water to be treated which is on its way to the evaporator.

BACKGROUND OF THE INVENTION

For the treatment of salt water or water contaminated by microbes and/or algae to produce drinking water or as process water, it is known to purify the water by distillation or reverse osmosis. Depending on the type of treatment plant, it may be necessary to use a control system or, for larger plants, a process control system. For water treatment in areas where, for example, no personnel are available to maintain the system, such a system must be operated as autonomously as possible. It is possible to use automated and autonomous control systems. However, these are generally sensitive and may also be prone to faults.

The task of the invention is to provide a water treatment plant which, on the one hand, has a very simple structure and few parts that are susceptible to failure, and which is also scalable. It is precisely in the area of scalability that water treatment plants differ considerably from one another, depending on the scale.

SUMMARY OF THE INVENTION

According to an idea of the invention, it is provided that the storage container is arranged above the evaporator, and the condenser is arranged at the level of the base of the evaporator, wherein the storage container can be closed airtight and opens with an outlet into an overflow pot, the level of which is arranged slightly below a vapor outlet of the evaporator, and wherein the overflow pot is connected to the cooling water inlet of the condenser, and wherein a cooling water outlet of the condenser is connected to an inlet of the evaporator. The idea of the invention is pressureless operation in the area of primary desalination or in the area of evaporation. Unpressurized operation means that the storage container can be sealed airtight. The airtight seal allows the level of the water flowing into the evaporator to be kept constant without the need for a control system that regulates or controls the evaporation. The overflow pot used for this purpose has an open pot. An outlet of the storage container flows into this pot. If the overflow pot is empty, water drips from the outlet into the overflow pot, with air also flowing into the outlet with each drop. Emptying the storage container is therefore similar to pouring out a bottle. The bottom of the overflow pot is connected to an outlet pipe that leads to other units of the water treatment system. If the system is filled to a predetermined level, the overflow pot also fills up until the outlet of the storage container leading into the overflow pot is reached. Air can now no longer flow into the storage pot, which inhibits the outflow. This inhibiting effect is known from a filled bottle that is immersed in a liquid level but is still essentially above the liquid level.

The water from the overflow tank then flows into a condenser. The condenser is designed so that the water vapor from an evaporator flowing through the condenser heats the receiver as much as possible. It is therefore less important for the condenser to cool the condensate than to heat the receiver as much as possible. The condenser therefore acts as a recuperator, which feeds the latent heat in the evaporated water back into the evaporation process. In the evaporator, it is necessary to supply the enthalpy of evaporation. This is usually the sub-process that absorbs the most energy. This evaporation enthalpy is fed back to the receiver as latent heat during recuperation. Once the water treatment system has heated up, the energy input required in the evaporator is reduced to the energy for the physical and chemical transport processes, the energy loss through radiation and the apparent energy loss through energy degradation in a heat cycle. Recuperation therefore enables water treatment with comparatively little energy input. The water treatment system can therefore also be operated with a very moderate energy inflow. For example, the evaporator can be a solar evaporator that absorbs solar radiation and then heats the water to be treated. In the evaporator, the water to be treated starts to boil, evaporates, creating a purification step, and in the condenser the heat is transferred to the following water to be treated. This reduces the heating of the water to be treated from the initial temperature to the boiling point to a small temperature difference.

In an embodiment of the water treatment plant according to the invention, it can be provided that a condensate water outlet of the condenser is connected to a branch which leads a larger part of the condensate water into a distillate tank, and leads a smaller part of the condensate water into an electrolysis cell, wherein condensate water is split into hydrogen and oxygen in the electrolysis cell, and wherein the electrolysis cell is connected to the distillate tank on the oxygen-forming side, so that oxygen formed flows into the distillate tank and gasifies the condensate water there as distillate. The smaller part of the condensate water that is led to the electrolysis cell is present there, in the electrolysis cell, as distilled water, where it can be electrolyzed in an uncontrolled manner. The unregulated electrolysis with electric current, which can come from a solar panel and/or a wind turbine, for example, leads to the splitting of the water into molecular hydrogen and molecular oxygen. Depending on the size and scaling of the water treatment plant, the molecular hydrogen can be discarded by releasing it into the atmosphere or fed into a hydrogen storage tank. Hydrogen storage is generally less practical for smaller systems. The oxygen produced during electrolysis can be added to the condensate water for oxygenation. Oxygenation can be carried out at a pressure of 100 bar, over 200 bar up to 300 bar. This preserves the oxygenated water in the distillate tank. In addition, the pressure in the distillate tank means that the oxygenated water has an inherent pressure for pumping through a corresponding valve.

In order to be able to operate the evaporator with as little energy input as possible, it may be provided that the evaporator is a solar evaporator and is completely thermally insulated. Thermal insulation can be achieved by placing the evaporator in a container covered with a transparent pane. Thermally conductive thermal bridges should be avoided wherever possible. The thermally insulating container can also be evacuated in order to avoid air as a thermal bridge. This design enables water treatment even when the sky is overcast. For this purpose, it is necessary that the water treatment system is heated once. After heating, the purification of the water to be treated requires only a fraction of the energy due to the recuperation of heat in the condenser, which is designed for the highest possible heat recuperation and not for the highest possible cooling.

There is no dedicated sump in the water treatment system presented here. Instead, the sump collects in the evaporator due to the concentration of salt, microbes and/or algae. In order to clean the evaporator, it may be provided in embodiments of the invention that the storage container is connected to the head of the evaporator via a tap, the evaporator having a drain valve at its lower end. Thus, when the tap is actuated, the water from the storage container does not flow into the base of the evaporator, but into the head of the evaporator and flows out of the base of the evaporator. In this cleaning mode, the evaporator is cleaned with the water to be treated by draining the concentrated sump.

The electrodes of the optional electrolysis cell can be powered by a photovoltaic panel and/or a wind turbine, whereby the photovoltaic panel and/or the wind turbine are part of the water treatment system. The energy required for electrolysis is only a fraction of the energy required for evaporation. The amount of oxygen required for oxygenation is still low compared to the amount of treated water, even when high pressures of up to 100 bar, 200 bar and 300 bar are used.

In an embodiment of the water treatment system according to the invention, it may be provided that a further storage container is connected to the distillate tank via a tap, via which water from the further storage container enters the distillate tank in order to feed the condensate water contained therein as distillate with electrolytes from the further storage container. The liquid in the additional storage container can be a prepared electrolyte liquid, but can also come from the same source as the water to be treated. As recontamination takes place when the water to be treated is fed into the condensate water/distillate, the aforementioned oxygenation makes sense. Recontamination is less harmful when pure seawater is desalinated. When treating water contaminated with amoebae, for example, recontamination means that the condensate water/distillate would be unusable. Oxygenation under high pressure, however, leads to poisoning of the microbes.

Unlike evaporation, oxygenation should preferably be carried out at higher pressures. In order to be able to carry out oxygenation at high pressure, the distillate tank and the electrolysis cell can be pressure-tight via a non-return valve on the inlet side and have a safety valve that responds at 100 bar, preferably at 200 bar, particularly preferably at 300 bar.

The water treatment system presented here is characterized by its good scalability. For very small systems, the volumes of the storage container and the distillate tank can be between 3 liters and 10 liters, whereby the water treatment system is constructed in a frame that can be moved from one location to another.

As a larger system, however, it is also possible that the volumes of the storage container and the distillate tank are between 3 m3 and 100 m3, whereby the water treatment system is anchored to the ground in a foundation.

Corresponding to the water treatment plant presented here, the corresponding method is also claimed. This method comprises the following steps: pressureless heating of water to be treated in a condenser on the cooling water side, evaporating the preheated water to be treated in an evaporator, passing the steam through the condenser on the condensate side, storing the water vapor condensed in the condenser as distillate in a pressure-tight distillate tank, oxygenating the water vapor condensed in the condenser as distillate at a pressure between 100 bar and 300 bar by oxygen previously obtained from electrolysis of a part of the distillate.

BRIEF DESCRIPTION OF THE DRAWINGS

The invention is explained in more detail with reference to the following figures.

DETAILED DESCRIPTION OF THE PREFERRED EMBODIMENTS

Figure 1:
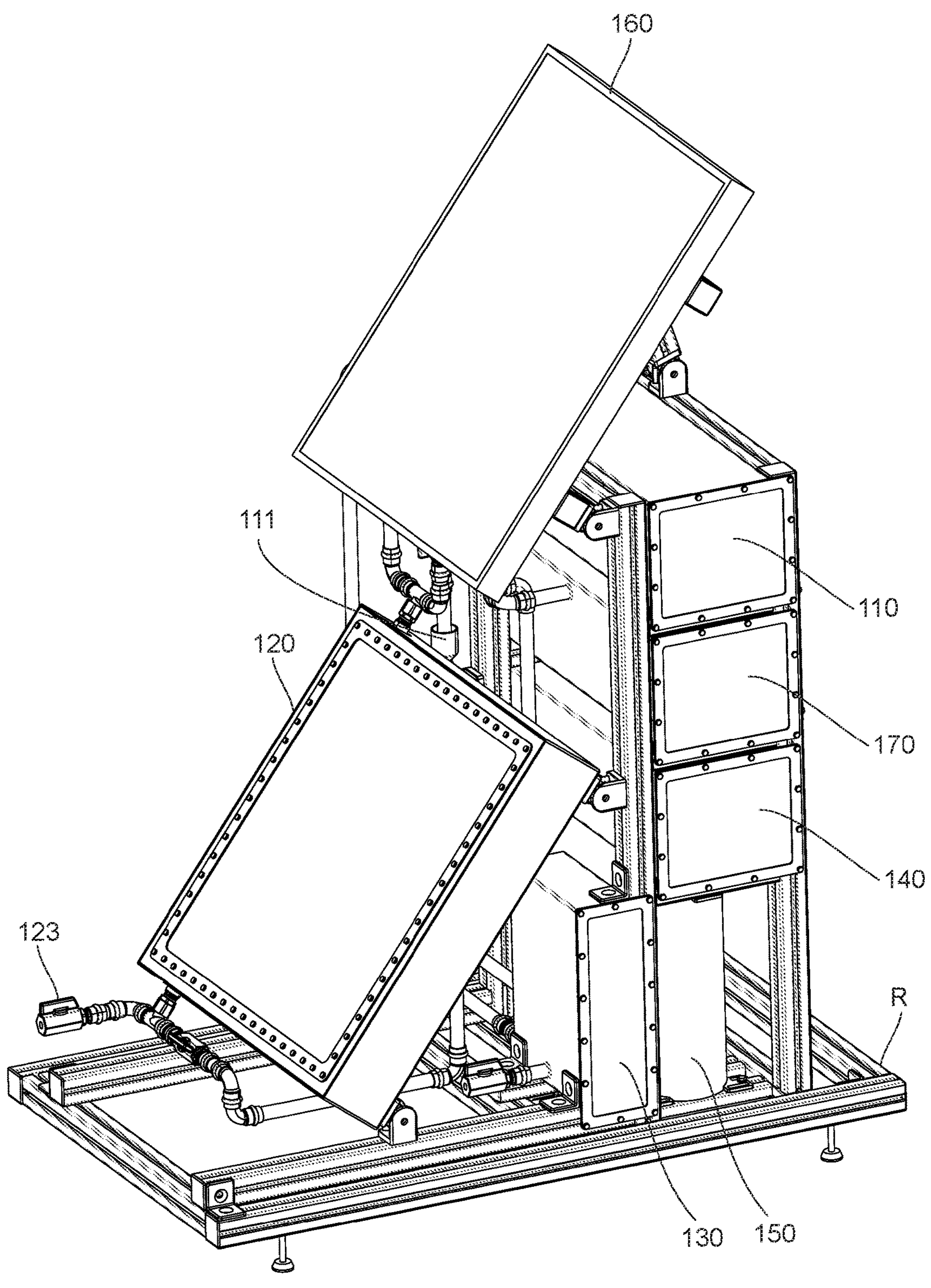
FIG. 1 is a sketch of a water treatment system according to the invention in a perspective view from the front.

FIG. 1 shows a sketch of a water treatment system according to the invention 100 in a perspective view from the front. In this embodiment, the water treatment system 100 consists of the upper storage container 110, the evaporator 120 and the condenser 130, which is optimized as a recuperator in which the water to be treated, which cools the steam (evaporated water), is heated as much as possible. In addition to these three basic elements, the water treatment system 100 also has the distillate tank 140, an electrolysis cell 150, a solar panel 160 and a further storage container 170. This embodiment of the water treatment system 100 according to the invention shown here is constructed in a frame R so that it can be transported from one location to another. However, it is also possible to scale this system and connect it firmly to the ground in a foundation. The water to be treated from the storage container drips or falls into an overflow pot 111, which is used to determine the level of the water to be treated in the evaporator. This overflow pot enables automatic control of the evaporator level, whereby the evaporator side and condenser side of the water treatment system are depressurized.

Figure 2:
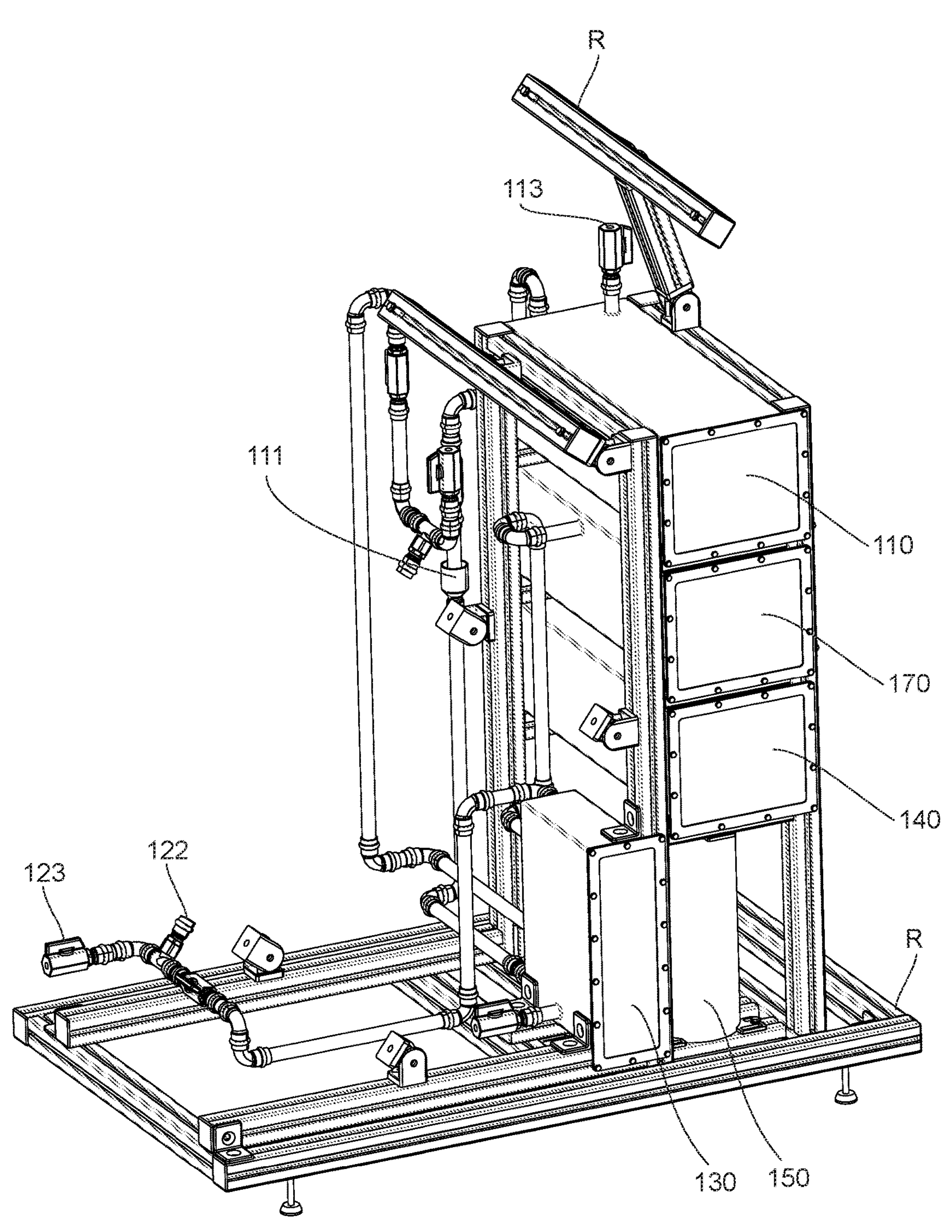
FIG. 2 is a perspective view of the water treatment system from FIG. 1 from the front without the evaporator and without the solar panel.

FIG. 2 shows a perspective view of the water treatment system from FIG. 1 from the front without the evaporator and without the solar panel. The connecting pipes between the overflow pot 111 and the condenser 130 can be clearly seen. Furthermore, the connecting pipe can be seen from the condenser 130 to the inlet 122 to the evaporator 120, which is hidden here. A drain valve 123, which can be opened to clean the evaporator, is arranged in the immediate vicinity of the inlet 122. This view also shows an inlet 113 to the storage container 110. This inlet can be used for aeration or also for filling the storage container 110 with water to be treated.

Figure 3:
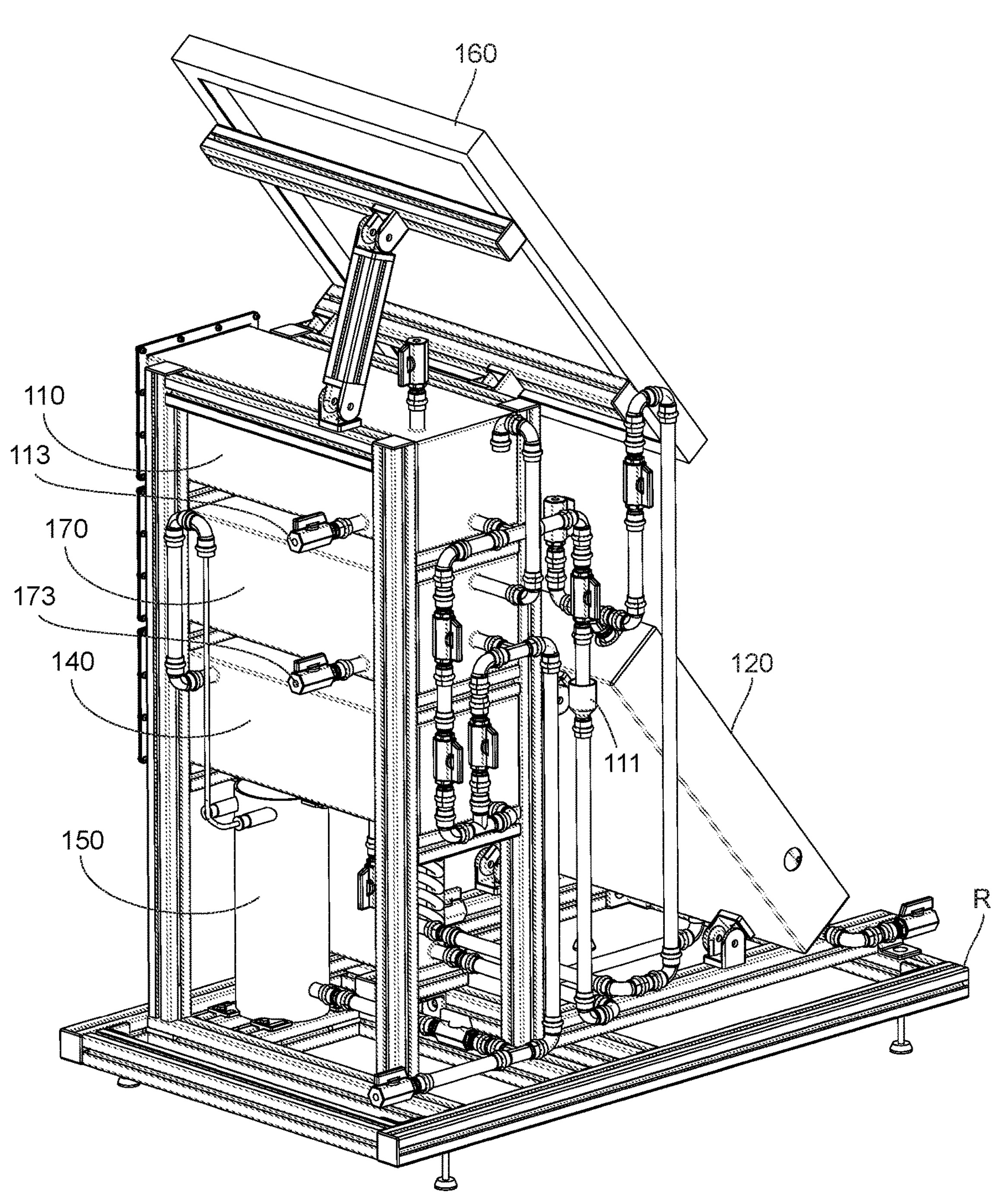
FIG. 3 is a perspective view of the water treatment system from FIG. 1 from behind.

FIG. 3 shows a perspective view of the water treatment system from FIG. 1 from behind. This view clearly shows the connection of the individual units. In this view, the storage containers 110 arranged one above the other, the further storage container 170 and the distillate tank 140 arranged underneath are shown. The storage container has a further inlet 113, which is also used as a drain for water to be treated that is present in the storage container. The further storage container 170 with the inlet 173 is shown below the storage container 110.

Figure 4:
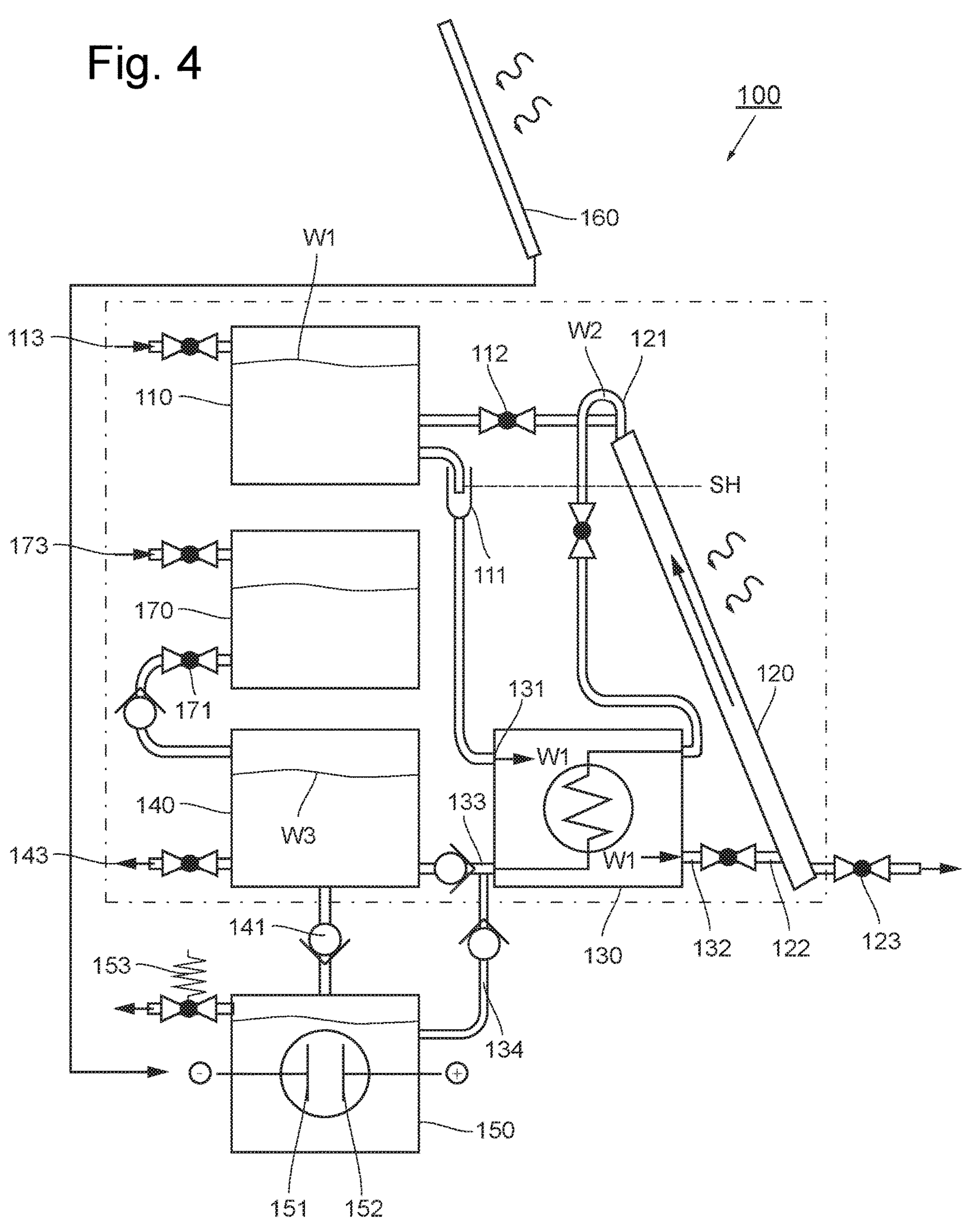
FIG. 4 is a rough sketch of the individual parts of the water treatment system according to the invention from FIG. 1 to illustrate the function.

Finally, FIG. 4 shows a rough sketch of the individual parts of the water treatment system according to the invention shown in FIG. 1 to illustrate its function. This system shown here embodies all the features, both the essential features of the invention and the further features according to the below description.

The water treatment system 100 has the following units: firstly, at least one storage container 110 for storing the water W1 to be treated. The water W1 to be treated can be filled into the storage container 110 via an inlet 113. Furthermore, the water treatment system 100 has at least one evaporator 120 for evaporating the water W1 to be treated. A further unit is at least one condenser 30 for condensing the water W2 evaporated in the evaporator 120. The condenser 130 is fed with water W1 to be treated on the cooling water side. The water W1 to be treated is on its way to the evaporator 120. The aforementioned storage container 110 is arranged above the evaporator 120 so that the water W1 to be treated enters the evaporator by gravity as feed water. The condenser 130, on the other hand, is arranged at the level of the base of the evaporator 120. The storage container 110 can be closed airtight and opens with an outlet into an overflow pot 111. The surface height SH of the overflow pot 111 is positioned slightly below a steam outlet 121 of the evaporator 120. The lower outlet of the overflow pot 111 is connected to the cooling water inlet 131 of the condenser 130, so that the water W1 to be treated flows from the storage container 110 into the condenser 130 as cooling water. A cooling water outlet 132 of the condenser 130 is connected to an inlet 122 of the evaporator 120, wherein a shut-off valve is arranged there to enable cleaning of the evaporator 120 by opening the tap 112 and tap 123. Thus, in order to clean the evaporator 120 from the concentrating sump, it is provided that the receiver 110 is connected to the head of the evaporator 120 via a tap 112, the evaporator 120 having a drain valve 123 at its lower end. To ensure that the water W1 to be treated flows freely, the inlet 113 can be opened so that air can enter the storage container when the storage container 110 is emptied.

A condensate water outlet 133 of the condenser 130 is connected to a branch 134, which leads a larger part of the condensate water W3 into a distillate tank 140, and leads a smaller part of the condensate water W3 into an electrolysis cell 150. In the electrolysis cell 150, the condensate water W3 is electrolytically decomposed into hydrogen H2 and oxygen O2. The electrolysis cell 150 is connected to the distillate tank 140 on the oxygen-forming side, so that the oxygen 02 formed flows into the distillate tank 140 and gasses the condensate water W3 as distillate. This gassing is the oxygenation of the distillate water in order to sterilize it and make it durable. In the electrolysis cell 150, the electrodes 151, 152 are connected to a photovoltaic panel 160. For this purpose, the photovoltaic panel 160 is part of the water treatment system 100. The distillate tank 140 and the electrolysis cell 150 are designed to be pressure-tight via a non-return valve 141 on the inlet side and a safety valve 153 ensures that it responds at 100 bar, 200 bar or 300 bar in order to prevent the pressure of the electrolysis gas from rising.

A further storage container 170 is connected to the distillate tank 140 via a tap 171, via which water or a prepared electrolyte liquid from the further storage container 170 enters the distillate tank 140 in order to feed the condensate water W3 contained therein as distillate with electrolytes from the further storage container 170. Charging takes place before the distillate tank is pressurized.

In the embodiment of the water treatment system according to the invention shown here, the evaporator 120 is a solar evaporator and this is completely thermally insulated by being contained in an evacuated container with a transparent disk. The thermal insulation enables a high degree of recuperation of the evaporation heat absorbed in the evaporator by the water W1 to be treated.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST

100 Water treatment plant
110 Storage container
111 Overflow pot
112 Tap
113 Inlet
120 Vaporizer
121 Vapor outlet
122 Input
123 Drain valve
121 Vapor outlet
130 Capacitor
131 Cooling water inlet
132 Cooling water outlet
133 Condensate water outlet
140 Distillate tank
141 Check valve
142 Safety valve
143 Outlet
150 Electrolytic cell
151 Electrode
152 Electrode
160 Photovoltaic panel
170 Storage container
171 Tap
173 Inlet
R Frame
SH Surface height
W1 Water to be treated
W2 vaporized water
W3 Condensate water

The invention claimed is:

1. A treatment plant for water to be treated, comprising:

a storage container configured to store the water to be treated, an evaporator configured to evaporate the water to be treated into vaporized water, a condenser configured to condense water evaporated in the evaporator into condensate water, wherein the condenser is fed on a cooling water side with water to be treated, which is flowing to the evaporator, wherein the storage container is arranged above the evaporator, and wherein the condenser is arranged at a level of a base of the evaporator, wherein the storage container is configured to be closable in an airtight manner and openable with an outlet into an overflow pot, a surface height of the overflow pot arranged slightly below a vapor outlet of the evaporator to enable automatic control of a water level in the evaporator, and wherein the overflow pot is connected to a cooling water inlet of the condenser, and wherein a cooling water outlet of the condenser is connected to an inlet of the evaporator.

2. The water treatment plant according to claim 1, wherein a water outlet of the condenser for the condensate water is connected to a branch, which feeds a larger part of the condensate water into a distillate tank, and feeds a smaller part of the condensate water into an electrolytic cell, wherein in the electrolysis cell, condensate water is decomposed into hydrogen and oxygen, wherein the electrolysis cell is connected to the distillate tank on an oxygen- forming side, so that oxygen formed flows into the distillate tank and gasses the condensate water there as distillate.

3. The water treatment plant according to claim 2, wherein the evaporator is a solar evaporator and is fully thermally insulated.

4. The water treatment plant according to claim 1, wherein the storage container is connected to a head of the evaporator via a tap, the evaporator having a drain valve at a lower end thereof.

5. The water treatment plant according to claim 2, wherein electrodes of the electrolysis cell are connected to at least one of a photovoltaic panel or a wind turbine, wherein the at least one photovoltaic panel or the wind turbine are part of the water treatment plant.

6. The water treatment plant according to claim 2, wherein a further storage container is connected to the distillate tank via a tap, via which water from the further storage container enters the distillate tank in order to feed the condensate water contained therein as distillate with electrolytes from the further storage container.

7. The water treatment plant according to claim 2, wherein the distillate tank and the electrolytic cell are pressure-tight on the inlet side via a non-return valve and has a safety valve that responds at 100 bar.

8. The water treatment plant according to claim 2, wherein the distillate tank and the electrolytic cell are pressure-tight on the inlet side via a non-return valve and has a safety valve that responds at 200 bar.

9. The water treatment plant according to claim 2, wherein the distillate tank and the electrolytic cell are pressure-tight on the inlet side via a non-return valve and has a safety valve that responds at 300 bar.

10. The water treatment plant according to claim 2, wherein volumes of the storage container and the distillate tank are between 3 liters and 10 liters, and wherein the water treatment plant is constructed in a frame which is movable from one location to another.

11. The water treatment plant according to claim 2, wherein volumes of the storage container and of the distillate tank are between 3 $m^3$ and 100 $m^3$, and wherein the water treatment plant is anchored in a foundation.

* * * * *